(12) United States Patent
Meda

(10) Patent No.: US 6,925,081 B2
(45) Date of Patent: Aug. 2, 2005

(54) MPLS DEVICE ENABLING SERVICE PROVIDERS TO CONTROL SERVICE LEVELS IN FORWARDING OF MULTI-LABELED PACKETS

(75) Inventor: Sreenath GovindaRaju Meda, Karnataka (IN)

(73) Assignee: Cisco Technology, Inc., San Jose, CA (US)

(*) Notice: Subject to any disclaimer, the term of this patent is extended or adjusted under 35 U.S.C. 154(b) by 70 days.

(21) Appl. No.: 10/617,039

(22) Filed: Jul. 11, 2003

(65) Prior Publication Data

US 2005/0008015 A1 Jan. 13, 2005

(51) Int. Cl.$^7$ .............................................. H04L 12/54
(52) U.S. Cl. ...................... 370/392; 370/401; 370/469
(58) Field of Search ................................ 370/351–356, 370/400, 401, 389, 392, 466, 469, 395.1, 395.52; 709/238, 246

(56) References Cited

U.S. PATENT DOCUMENTS

| | | | |
|---|---|---|---|
| 2002/0009050 A1 * | 1/2002 | Ueno | 370/230 |
| 2002/0037010 A1 * | 3/2002 | Yamauchi | 370/395.53 |
| 2003/0053414 A1 * | 3/2003 | Akahane et al. | 370/216 |
| 2003/0053464 A1 * | 3/2003 | Chen et al. | 370/400 |
| 2003/0118026 A1 * | 6/2003 | Kuhl et al. | 370/395.21 |
| 2003/0185217 A1 * | 10/2003 | Ganti et al. | 370/395.5 |

OTHER PUBLICATIONS

Rosen, et al. ; Entitled,"Request for Comments: 3031—Multiprotocol Label Switching Architecture"; Jan. 2001; Available from www.ietf.org; (61 Pages).

Rosen, et al. ; Entitled,"Request for Comments: 3032—MPLS Label Stack Encoding"; Jan. 2001; Available from www.ietf.org; (23 Pages).

"MPLS VPN—Inter–AS—IPv4 BGP Label Distribution", Cisco IOS Release 12.2(13)T, Available at: http://www.cisco.com/en/US/products/sw/iosswrel/ps1839/products_feature_guide09186a0080110be9.html, Downloaded on Jul. 2, 2003, (72 Pages).

"Configuring the Modular Quality of Service Command–Line Interface",Cisco IOS Quality of Service Solutions Configuration Guide, Available at: http://www.cisco.com/en/US/products/sw/iosswrel/ps1835/products_configuration_guide_chapter09186a00800bd909.html#89799, Downloaded on Jul. 2, 2003, (12 Pages).

* cited by examiner

*Primary Examiner*—Ricky Ngo
*Assistant Examiner*—Duc Duong
(74) *Attorney, Agent, or Firm*—Narendra R Thappeta

(57) ABSTRACT

A MPLS device which receives configuration data identifying a group of multi-labeled packets and desired EXP (corresponding to the 3-bit experimental bit field specified by MPLS protocol) bits (even in the lower label entries of the label stack) for the group when forwarding the related packets. The MPLS device sets the EXP bits of even such lower label entries, and then forwards the multi-labeled packets. MPLS devices further down the path may provide different services for different multi-labeled packets depending on the EXP bit values. A service provider may configure a autonomous system border router (ASBR) to control service levels for while packets are forwarded further down the path (even in autonomous systems not related to the service provider) according to an aspect of the present invention.

22 Claims, 5 Drawing Sheets

310: class-map c-name
315:    match mpls exp label 2 3

325: policy-map p-name
330:    class c-name
335:    set mpls exp label * 5

340: Interface Serial0/0
345:    service-policy output p-name

*FIG. 3A*

350: class-map d-name
355:    match mpls exp label 1 7

365: policy-map q-name
370:    class d-name
375:    set mpls exp label 1 4
380:    set mpls exp label 2 6

390: Interface Serial1/1
395:    service-policy output q-name

*FIG. 3B*

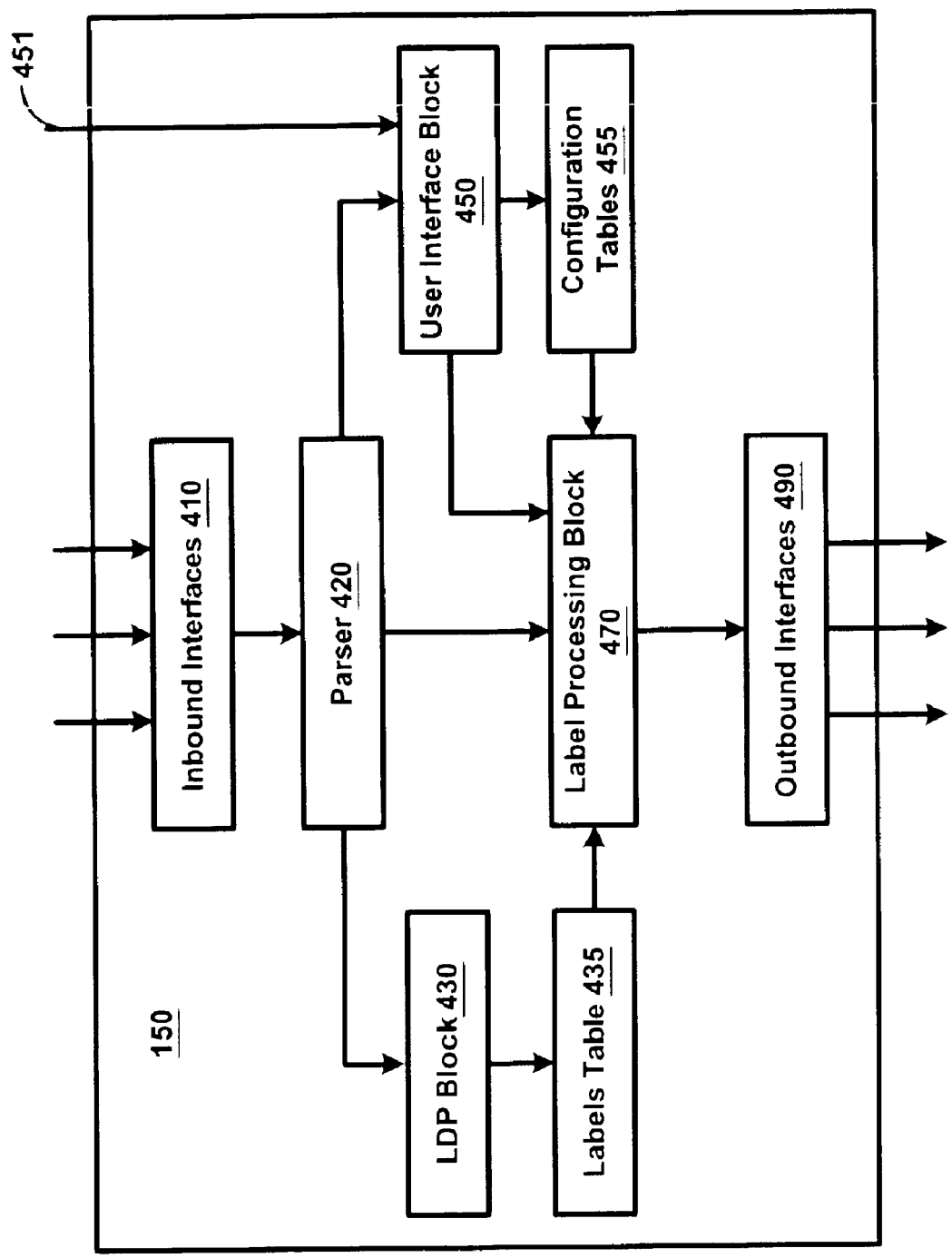

MPLS DEVICE ENABLING SERVICE PROVIDERS TO CONTROL SERVICE LEVELS IN FORWARDING OF MULTI-LABELED PACKETS

BACKGROUND OF THE INVENTION

1. Field of the Invention

The present invention relates to multi-protocol label switching (MPLS) devices used in telecommunication networks, and more specifically to a method and apparatus implemented in such devices for enabling service providers to control service levels in forwarding of multi-labeled packets.

2. Related Art

Multiprotocol label switching (MPLS) is often used to transport data packets such as those already in the form of Internet Protocol (IP). MPLS is described in further detail in RFC 3031 entitled, "MPLS Architecture" available at www.ietf.org. In general, a MPLS device (e.g., label switch router) makes a forwarding decision based only on a first label received first (in network transmission order) associated with a data packet. As a result, data packets may be quickly forwarded without substantial processing and examining overhead, as is well known in the relevant arts.

Multi-labeled packets (also referred to as labeled packets) generally contain a label stack ahead of the corresponding data packet. The label stack in turn contains multiple label entries, with an S-bit of only the last label entry being set to 1 to indicate the end of stack. The S-bit of the remaining label entries is set to 0 indicating the presence of additional label entries.

Each label entry of an multi-labeled packet also contains three EXP bits (at positions 21–23 of each label entry), which are described as being reserved for experimental use in RFC 3032, also available at www.ietf.org. The EXP bits are also known to be used for determining the service levels (e.g., prioritization in forwarding, assignment of multi-labeled packets to higher bandwidth paths in case multiple paths are present) while forwarding multi-labeled packets.

While forwarding IP data packets using MPLS, a provider edge (PE) router of a prior approach copies the three precedence bits in the type of service field (byte 2 of IP header, described in RFC 791) as the EXP bits of all stack entries when an IP packet is first received into an MPLS based network and the label stack is created. The EXP bits in each label entry are then used to determine the service levels while forwarding the IP data packet on a corresponding portion of the MPLS network.

BRIEF DESCRIPTION OF THE DRAWINGS

The present invention will be described with reference to the accompanying drawings, wherein:

FIGS. 3A and 3B are diagrams illustrating the manner in which an administrator may provide configuration data in an embodiment of the present invention.

FIG. 4 is a block diagram illustrating the details of an embodiment of an MPLS device provided according to an aspect of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview and Discussion

A MPLS device implemented according to an aspect of the present invention enables service providers to control service levels in forwarding of multi-labeled packets. A feature according to an aspect of the present invention enables an administrator of a MPLS device to provide configuration data indicating the desirable EXP bits for a low level (i.e., other than the top label) label entries in a multi-level stack of a multi-labeled packet (containing label stack and packet data).

The MPLS device may then modify EXP bits in the corresponding label entries as specified by the configuration data. MPLS devices further down the path (possibly in portions of networks managed by other service providers) may use the modified EXP bits in determining the service levels to be offered while forwarding the packet. As a result, a service provider may be provided the ability to control service levels in forwarding of multi-labeled packets in various portions of a network further down the path of the multi-labeled packet.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
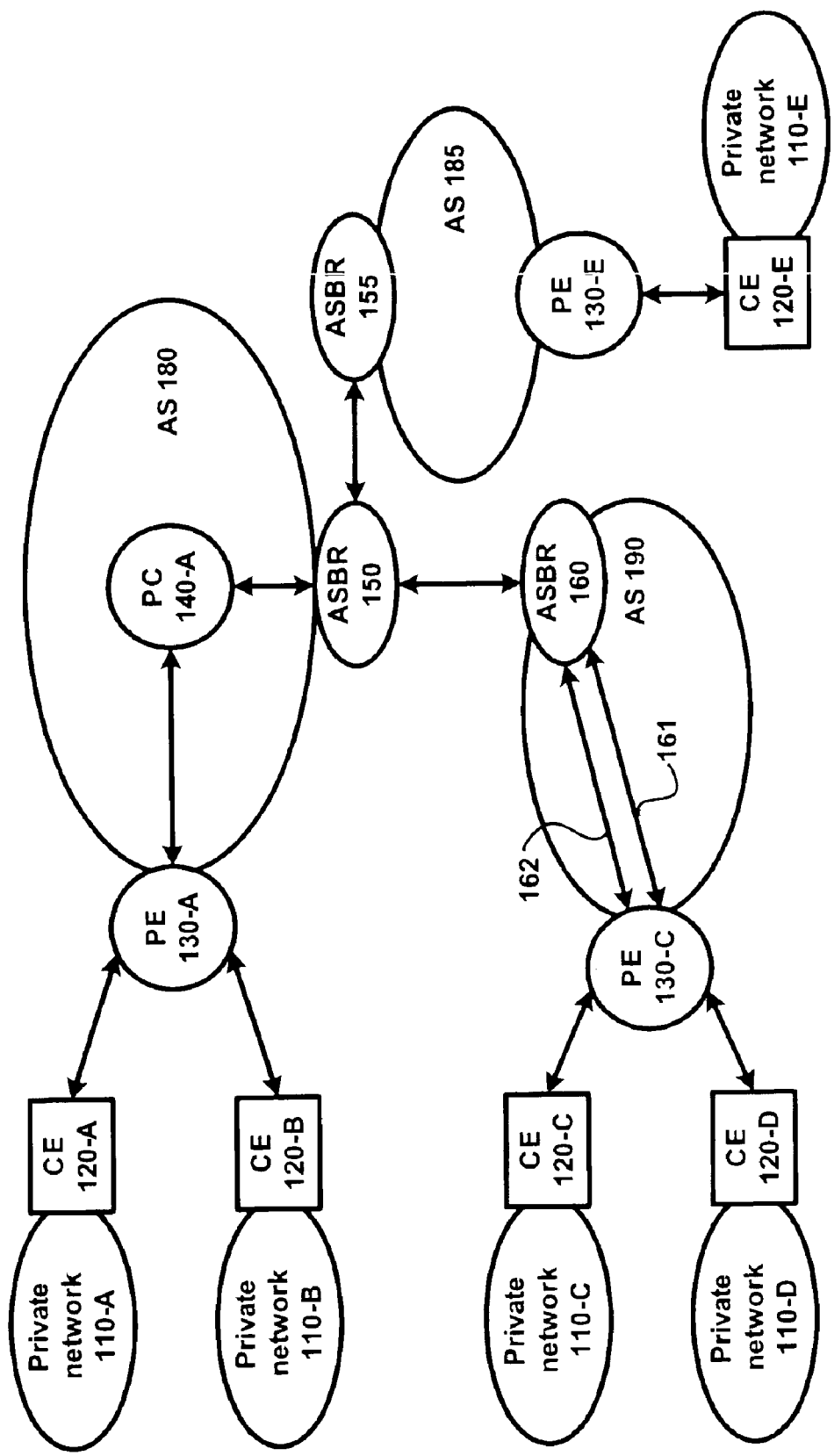
FIG. 1 is a block diagram illustrating an example environment in which the present invention can be implemented.

FIG. 1 is a block diagram illustrating an example environment in which the present invention can be implemented. The environment is shown containing private networks 100-A through 110-E, customer edge (CE) routers 120-A through 120-E, provider edge (PE) routers 130-A, 130-C, and 130-E, provider core (PC) router 140-A, autonomous system border routers (ASBR) 150, 155, and 160, and autonomous systems (AS) 180, 185 and 190. Each component is described below in further detail.

The description is continued with reference to an example scenario in which data packets corresponding to user systems (not shown) connected to private network 110-A and 110-B are respectively sent to user systems (not shown) connected to private network 110-C and 110-D (using virtual private network (VPN) concepts) for illustration. In addition, the environment is shown containing only a few representative systems for conciseness, however typical environments contain many more (types of) systems.

Each of private networks 110-A through 110-E may contain several user systems (not shown) which are provided connectivity to user systems in corresponding private networks only. For example, private networks 110-A, 110-C and 110-E are assumed to be part of one logical private network, and private networks 110-B and 110-D are assumed to be part of another logical private network. Connectivity may be provided only between user systems of the same logical private network.

Autonomous systems (AS) 180, 185 and 190 represent provider networks which are potentially owned/managed by different service providers. For example, each autonomous system may be managed by service providers in different countries. Each AS may contain several provider core (PC) routers (e.g., PC router 140-A is shown contained within AS 180) to forward multi-labeled packets to a PE or ASBR as necessary for delivering the contained data packet to a destination user system.

Each service provider provides one or more PE routers (PEs 130-A, 130-C and 130-E respectively in the cases ASs 180, 185 and 190) at the edge of the provider network to provide connectivity to the private networks. The PE routers, in turn, are connected to CE routers provided at the edge of private networks. Thus, PE router 130-A is shown connected to CE routers 120-A and 120-B, PE router 130-C is shown connected to CE routers 120-C and 120-D, and PE router 130-E is shown connected to CE 120-E.

In general, each PE router receives a data packet (e.g., in IP) from a corresponding CE, and appends a label stack (containing one or more label entries) to the received data packet. The label entries may determine the path (and service levels) on which the multi-labeled packets may be forwarded. The number of entries in a label stack and the contents of each label entry may be determined, for example, by label distribution protocol described in detail in RFC 3036 entitled, "LDP specification" available at www.ietf.org.

For example, PE 130-A may receive an IP packet destined to private network 110-C from CE 120-A, and appends a label stack containing three label entries—bottom, second and top label entry. The data packet along with the label stack is referred to as a multi-labeled packet. The top label may cause the multi-labeled packet to be forwarded to PC router 140-A, which may be set (or swap) the value in the top label to a new value, and send the entire multi-labeled packet with the swapped label to ASBR 150.

ASBR 150 generally provides an interface with ASBRs in other autonomous systems, and operates as an aggregation point for packets being forwarded to (also, received from) such autonomous systems. With reference to the example described above, ASBR 150 may be implemented to pop the top label entry, and the next (second) label entry may be used to determine the specific path (either to ASBR 160 or ASBR 155) on which the multi-labeled packet is to be forwarded. Thus, the multi-labeled packet forwarded from ASBR 150 may contain only two label entries.

ASBR 150 may further swap the label value (first 20 bits of a label entry, per RFC 3032) in the top entry (i.e., the second entry in the received multi-labeled packet) and forward the multi-labeled packet containing a label stack with two entries to either ASBR 155 or ASBR 160. An aspect of the present invention enables a service provider of AS 180 to control the service levels offered to such multi-labeled packets forwarded by ASBR 150, as described below in further detail.

3. Method

Figure 2:
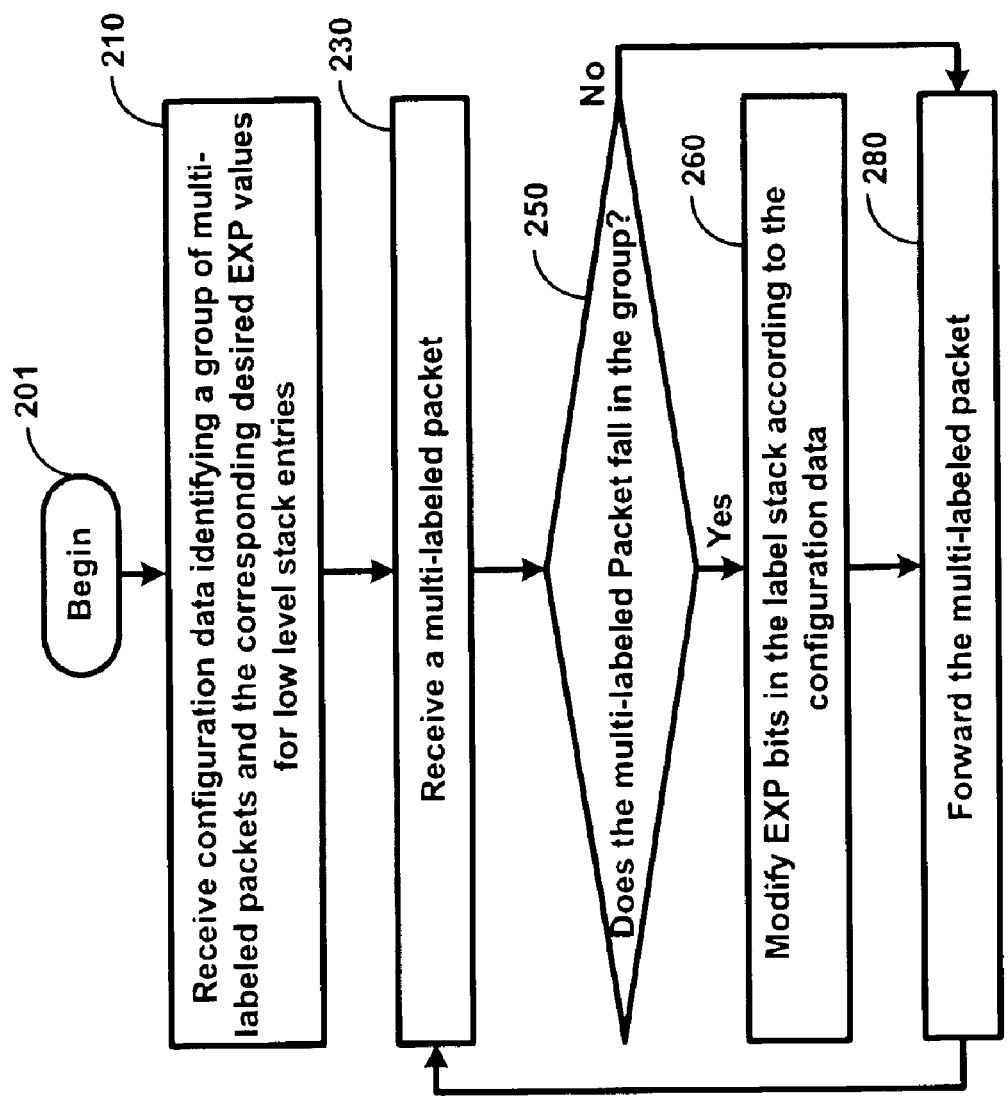
FIG. 2 is a flow chart illustrating a method in accordance with an aspect of the present invention.

FIG. 2 is a flow chart illustrating the manner in which a MPLS device enables a service provider to control service levels in forwarding of multi-labeled packets according to an aspect of the present invention. The method is described below with reference to ASBR 150 of FIG. 1 for illustration. However, the method may be implemented in other MPLS devices (which are in the middle of the path of a multi-labeled packet) and other environments as well. The method begins in step 201, in which control immediately passes to step 210.

In step 210, ASBR 150 receives configuration data identifying a specific group of multi-labeled packets and the desired EXP value of label entries at a lower (i.e., other than the top label) level in the label stack for the group of multi-labeled packets. Users may be provided the ability to specify information underlying the configuration data using any suitable user interface.

In step 230, ASBR 150 receives a multi-labeled packet containing a multi-level label stack. For example, with reference to FIG. 1, a data packet containing three label entries (bottom, second, and top label) may be received from PC 140-A. In step 250, ASBR 150 determines whether the multi-labeled packet falls within the group of packets specified in step 210. Various portions of the multi-labeled packet may be examined consistent with the configuration for such a determination.

In step 260, ASBR 150 modifies EXP bits of the lower level stack entries according to the configuration data. In the illustrative example, EXP bits in each of second label (top label when transmitted from ASBR 150) and bottom label may be modified (as top label is removed/popped by ASBR 150) based on the configuration data received in step 210.

In step 280, the multi-labeled packet is forwarded to either ASBR 155 or 160 according to the label value in the second label (generally after swapping the label value). The loop of steps 230–280 may be repeated for each multi-labeled packet received. Thus, it may be appreciated that the EXP bits of lower level stack entries may be set as desired by an administrator of ASBR 150.

The EXP bits may then be used by MPLS devices further down the path in determining the service levels (or quality of services) in forwarding the multi-labeled packet. For example, ASBR 160 may choose one of the paths 161 or 162 (providing different latency/bandwidth) depending on the EXP bits, and thus provide different service levels to different multi-labeled packets. The description is continued with reference to example approaches using which the group of multi-labeled packets and the desired EXP bits may be specified.

4. Configuration Data

FIGS. 3A and 3B illustrate examples of configuration data which may be specified by an administrator of ASBR 150. With respect to FIG. 3A, lines 310 and 315 together specify that a group (or class) with label c-name includes multi-labeled packets containing EXP bits equaling 3 in the bottom label (since the outgoing packet would contain only 2 labels in the illustrative example) of an outgoing multi-labeled packet.

Lines 325, 330, and 335 together specify a policy-map entitled "p-name", with the policy map being applicable (line 330) to a group of multi-labeled packets being specified by the class c-name (defined in lines 310–315), and the exp bits of all the labels (as specified by the wild card symbol '*') are set to a value of 5. Lines 340 and 345 cause the policy map "p-name" to be applied to the multi-labeled packets being forwarded on serial interface 0/0.

Thus, the configuration data of FIG. 3A may cause ASBR 150 to select multi-labeled packets with the second label of the outgoing packet having EXP bits equaling 3, and set the EXP bits of all the labels (including the second label) of the forwarded multi-labeled packets to 5.

With reference to FIG. 3B, lines 350 and 355 define a group (d-name) of multi-labeled packets which have EXP bits equaling 7 in the top most label of the outgoing multi-labeled packet (or the second label in the incoming multi-labeled packet). Lines 365, 370, 375, and 380 define a policy-map ("q-name") applied to the group (d-name) of multi-labeled packets, with the EXP fields of the first (second label in the incoming multi-labeled packet) and second/bottom labels of the outgoing multi-labeled packets being set to 4 and 6 respectively. Lines 390 and 395 cause the policy map to be applied to the serial interface 1/1.

While the classes/groups of above are described as being defined using only the EXP bits for illustration, it may be appreciated that more complex syntax may be used to specify the specific group of multi-labeled packets to apply the rules in the policy maps, and such implementations are covered by various aspects of the present invention. The description is continued with respect to the manner in which autonomous system border router (ASBR) may be implemented according to various aspects of the present invention.

5. Autonomous System Border Router (ASBR)

FIG. 4 is a block diagram illustrating an embodiment of ASBR implemented according to an aspect of the present invention. ASBR 150 is shown containing inbound interfaces 410, parser 420, LDP block 430, user interface 450, label processing block 470 and outbound interfaces 490. Each block is described below in further detail.

Inbound interfaces 410 provide physical, electrical and protocol interface to receive labeled packets (from PC 140-A, ASBRs 155 and 160) on a corresponding path. The received multi-labeled packets may be forwarded to parser 420. Similarly, outbound interfaces 490 provide physical, electrical and protocol interface to transmit labeled packets on a corresponding path. Both inbound and outbound interfaces may be implemented in a known way.

Parser 420 examines the received multi-labeled packets and passes each multi-labeled packet to one of LDP block 430, user interface block 450 or label processing block 470. The packets related to LDP protocol are passed to LDP block 430, packets related to specifying configuration data may be passed to user interface block 450, and packets which merely need to be forwarded further are passed to label processing block 470. Parser 420 may be implemented in one of several known ways.

LDP block 430 operates consistent with the LDP protocol and sets the entries in labels table 435 accordingly. In general, each entry specifies a mapping information of {inbound interface, inbound label value} to {outbound interface, outbound label value}. The mapping information may be used to forward the multi-labeled packets further as described below. LDP block 430 may be implemented in a known way.

User interface block 450 provides a suitable interface enabling the user to specify groups of multi-labeled packets and the desired EXP bits for each group. User interface block 450 may send multi-labeled packets using label processing block 470 for implementing such an interface. The configuration data generated as a result may be stored in configuration tables 455. In addition or in the alternative, user interface block 450 may be implemented using a command line interface (CLI) as represented by path 451.

Label processing block 470 receives multi-labeled packets which need to be forwarded on one of the outbound interfaces. Label processing block 470 receives from labels table 435 data representing the specific outbound interface on which to forward each labeled packet, and also the new value to be used for the top most label in the outgoing path. The label value is swapped accordingly.

In addition, the EXP fields of various label entries in the label stack may be modified according to the configuration data present in configuration tables 455. The multi-labeled packet with the modified EXP fields and swapped label is sent on the outbound interface specified by labels table 435. As the EXP values may determine the service levels provided while forwarding the multi-labeled packet further down the path, ASBR 150 may control the service levels.

It should be understood that each of the blocks of FIG. 4 can be implemented in a combination of one or more of hardware, software and firmware. When cost is of primary consideration, the implementation is performed more in software (e.g., using a processor executing instructions provided in software/firmware). Cost and performance can be balanced by implementing MPLS devices with a desired mix of hardware, software and/or firmware. An embodiment implemented substantially in software is described below.

6. Software Implementation

Figure 5:
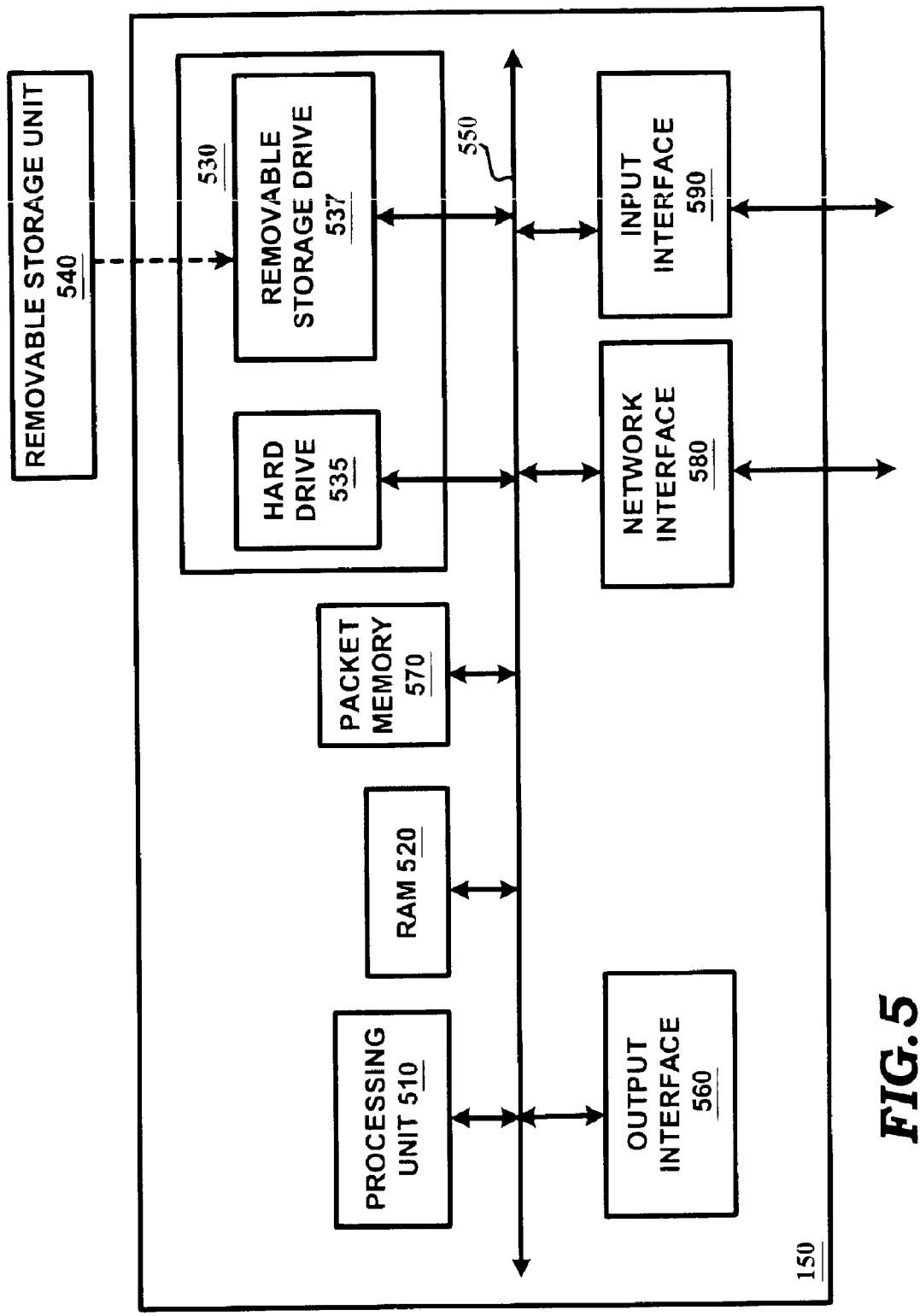
FIG. 5 is a block diagram illustrating the details of an embodiment of an MPLS device implemented using software according to an aspect of the present invention.

FIG. 5 is a block diagram illustrating the details of ASBR 150 in an embodiment of the present invention. ASBR 150 is shown containing processing unit 510, random access memory (RAM) 520, storage 530, output interface 560, packet memory 570, network interface 580 and input interface 590. Each component is described in further detail below.

Output interface 560 provides output signals (e.g., display signals to a display unit, not shown) which can form the basis for a suitable user interface for an administrator to interact (e.g., to provide configuration data without use of a network) with ASBR 150. Input interface 590 (e.g., interface with a key-board and/or mouse, not shown) enables an administrator to provide any necessary inputs for such a user interface.

Network interface 580 enables ASBR 150 to send and receive data on communication networks using MPLS protocol. Network interface 580, output interface 560 and input interface 590 can be implemented in a known way.

RAM 520 receives instructions on path 550 from storage 530, and provides the instructions to processing unit 510 for execution. Packet memory 570 stores (queues) multi-labeled packets waiting to be forwarded (or otherwise processed) on different ports/interfaces. RAM 520 may be used to store various data corresponding to labels table and configuration tables. RAM 520 and packet memory 570 may each be implemented as multiple units of memory and/or share the same memory unit(s).

Storage 530 may contain units such as hard drive 535 and removable storage drive 537. Secondary storage 530 may store the software instructions and data, which enable ASBR 150 to provide several features in accordance with the present invention. In an embodiment, labels table 435 and configuration tables 455 are implemented using RAM 520 and storage 530.

Some or all of the data and instructions may be provided on removable storage unit 540, and the data/instructions may be read and provided by removable storage drive 537 to processing unit 510. Floppy drive, magnetic tape drive, CD-ROM drive, DVD Drive, Flash memory, removable memory chip (PCMCIA Card, EPROM) are examples of such removable storage drive 537.

Processing unit 510 may contain one or more processors. Some of the processors can be general purpose processors which execute instructions provided from RAM 520. Some can be special purpose processors adapted for specific tasks (e.g., for memory/queue management). The special purpose processors may also be provided instructions from RAM 520.

In general, processing unit 510 reads sequences of instructions from various types of memory medium (including RAM 520, storage 530 and removable storage unit 540), and executes the instructions to provide various features of the present invention. While the above description is provided substantially with reference to a autonomous system border routers (ASBR), it should be understood that various features of the present invention may be performed in label switch routers (LSR) as well.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of processing multi-protocol label switching (MPLS) packets in a MPLS device, said method comprising:
   receiving a configuration data identifying a group of multi-labeled packets and a corresponding desired EXP value for a stack entry at a low level for said group of multi-labeled packets, wherein EXP corresponds to the experimental bit field in MPLS protocol;
   receiving a multi-labeled packet containing a data packet and a plurality of stack entries including a low stack entry at said low level;
   determining whether said multi-labeled packet falls in said group;
   setting EXP bits of said low stack entry to said corresponding desired value if said multi-labeled packet falls in said group; and
   forwarding said multi-labeled packet containing said desired value in EXP bits in said low stack entry.

2. The method of claim 1, wherein said MPLS device comprises an autonomous system border router (ASBR) located at an edge of a network managed by a service provider, wherein said service provider controls service levels in forwarding said multi-labeled packet further down a path by setting said EXP bits.

3. The method of claim 2, wherein said group of multi-labeled packets are identified by a value in EXP bits of a specific stack entry, wherein said determining comprises examining said multi-labeled packet as received for said value in EXP bits of said specific stack entry.

4. The method of claim 1, wherein said data packet is received in the form of Internet Protocol (IP).

5. A machine readable medium carrying one or more sequences of instructions for causing a multi-protocol label switching (MPLS) device to process packets, wherein execution of said one or more sequences of instructions by one or more processors contained in said MPLS device causes said one or more processors to perform the actions of:
   receiving a configuration data identifying a group of multi-labeled packets and a corresponding desired EXP value for a stack entry at a low level for said group of multi-labeled packets, wherein EXP corresponds to the experimental bit field in MPLS protocol;
   receiving a multi-labeled packet containing a data packet and a plurality of stack entries including a low stack entry at said low level;
   determining whether said multi-labeled packet falls in said group;
   setting EXP bits of said low stack entry to said corresponding desired value if said multi-labeled packet falls in said group; and
   forwarding said multi-labeled packet containing said desired value in EXP bits in said low stack entry.

6. The machine readable medium of claim 5, wherein said MPLS device comprises an autonomous system border router (ASBR) located at an edge of a network managed by a service provider, wherein said service provider controls service levels in forwarding said multi-labeled packet further down a path by setting said EXP bits.

7. The machine readable medium of claim 6, wherein said group of multi-labeled packets are identified by a value in EXP bits of a specific stack entry, wherein said determining comprises examining said multi-labeled packet as received for said value in EXP bits of said specific stack entry.

8. The machine readable medium of claim 5, wherein said data packet is received in the form of Internet Protocol (IP).

9. A MPLS (multi-protocol label switching) device processing MPLS packets, said MPLS device comprising:
   a memory storing a configuration data identifying a group of multi-labeled packets and a corresponding desired EXP value for a stack entry at a low level for said group of multi-labeled packets, wherein EXP corresponds to the experimental bit field in MPLS protocol;
   an inbound interface receiving a multi-labeled packet containing a data packet and a plurality of stack entries including a low stack entry at said low level;
   a label processing block determining whether said multi-labeled packet falls in said group and setting EXP bits of said low stack entry to said corresponding desired value if said multi-labeled packet falls in said group; and
   an outbound interface forwarding said multi-labeled packet containing said desired value in EXP bits in said low stack entry.

10. The MPLS device of claim 9, wherein said MPLS device comprises an autonomous system border router (ASBR) located at an edge of a network managed by a service provider, wherein said service provider controls service levels in forwarding said multi-labeled packet further down a path by setting said EXP bits.

11. The MPLS device of claim 10, wherein said group of multi-labeled packets are identified by a value in EXP bits of a specific stack entry, wherein said label processing block examines said multi-labeled packet as received for said value in EXP bits of said specific stack entry.

12. The MPLS device of claim 9, wherein said data packet is received in the form of Internet Protocol (IP).

13. A MPLS (multi-protocol label switching) device processing MPLS packets, said MPLS device comprising:
   means for receiving a configuration data identifying a group of multi-labeled packets and a corresponding desired EXP value for a stack entry at a low level for said group of multi-labeled packets, wherein EXP corresponds to the experimental bit field in MPLS protocol;
   means for receiving a multi-labeled packet containing a data packet and a plurality of stack entries including a low stack entry at said low level;
   means for determining whether said multi-labeled packet falls in said group;
   means for setting EXP bits of said low stack entry to said corresponding desired value if said multi-labeled packet falls in said group; and
   means for forwarding said multi-labeled packet containing said desired value in EXP bits in said low stack entry.

14. The MPLS device of claim 13, wherein said MPLS device comprises an autonomous system border router (ASBR) located at an edge of a network managed by a service provider, wherein said service provider controls service levels in forwarding said multi-labeled packet further down a path by setting said EXP bits.

15. The MPLS device of claim 14, wherein said group of multi-labeled packets are identified by a value in EXP bits of a specific stack entry, wherein said means for determining examines said multi-labeled packet as received for said value in EXP bits of said specific stack entry.

16. The MPLS device of claim 13, wherein said data packet is received in the form of Internet Protocol (IP).

17. A provider network containing:
- a MPLS (multi-protocol label switching) device processing MPLS packets, said MPLS device comprising:
- a memory storing a configuration data identifying a group of multi-labeled packets and a corresponding desired EXP value for a stack entry at a low level for said group of multi-labeled packets, wherein EXP corresponds to the experimental bit field in MPLS protocol;
- an inbound interface receiving a multi-labeled packet containing a data packet and a plurality of stack entries including a low stack entry at said low level;
- a label processing block determining whether said multi-labeled packet falls in said group and setting EXP bits of said low stack entry to said corresponding desired value if said multi-labeled packet falls in said group; and
- an outbound interface forwarding said multi-labeled packet containing said desired value in EXP bits in said low stack entry.

18. The provider network of claim 17, further comprising an edge device receiving said multi-labeled packet from a private network and forwarding said multi-labeled packet to said MPLS device.

19. The provider network of claim 18, wherein said MPLS device comprises an autonomous system border router (ASBR) located at an edge of a network managed by a service provider, wherein a service provider controls service levels in forwarding said multi-labeled packet further down a path by setting said EXP bits.

20. The provider network of claim 19, wherein said group of multi-labeled packets are identified by a value in EXP bits of a specific stack entry, wherein said label processing block examines said multi-labeled packet as received for said value in EXP bits of said specific stack entry.

21. The MPLS device of claim 19, wherein said data packet is received in the form of Internet Protocol (IP).

22. The provider network of claim 19, further comprising a plurality of core devices to forward said multi-labeled packet from said edge device to said ASBR.

* * * * *

UNITED STATES PATENT AND TRADEMARK OFFICE
CERTIFICATE OF CORRECTION

PATENT NO. : 6,925,081 B1 Page 1 of 1
APPLICATION NO. : 10/617039
DATED : August 2, 2005
INVENTOR(S) : Sreenath GovindaRaju Meda It is certified that error appears in the above-identified patent and that said Letters Patent is hereby corrected as shown below:

Col. 2, line 41, replace "100-A" with --110-A--.

Signed and Sealed this

Fourth Day of July, 2006

JON W. DUDAS
*Director of the United States Patent and Trademark Office*